No. 668,220. Patented Feb. 19, 1901.
A. RONTKE.
TRIMMER FOR SEWING MACHINES.
(Application filed Dec. 4, 1899.)
(No Model.)
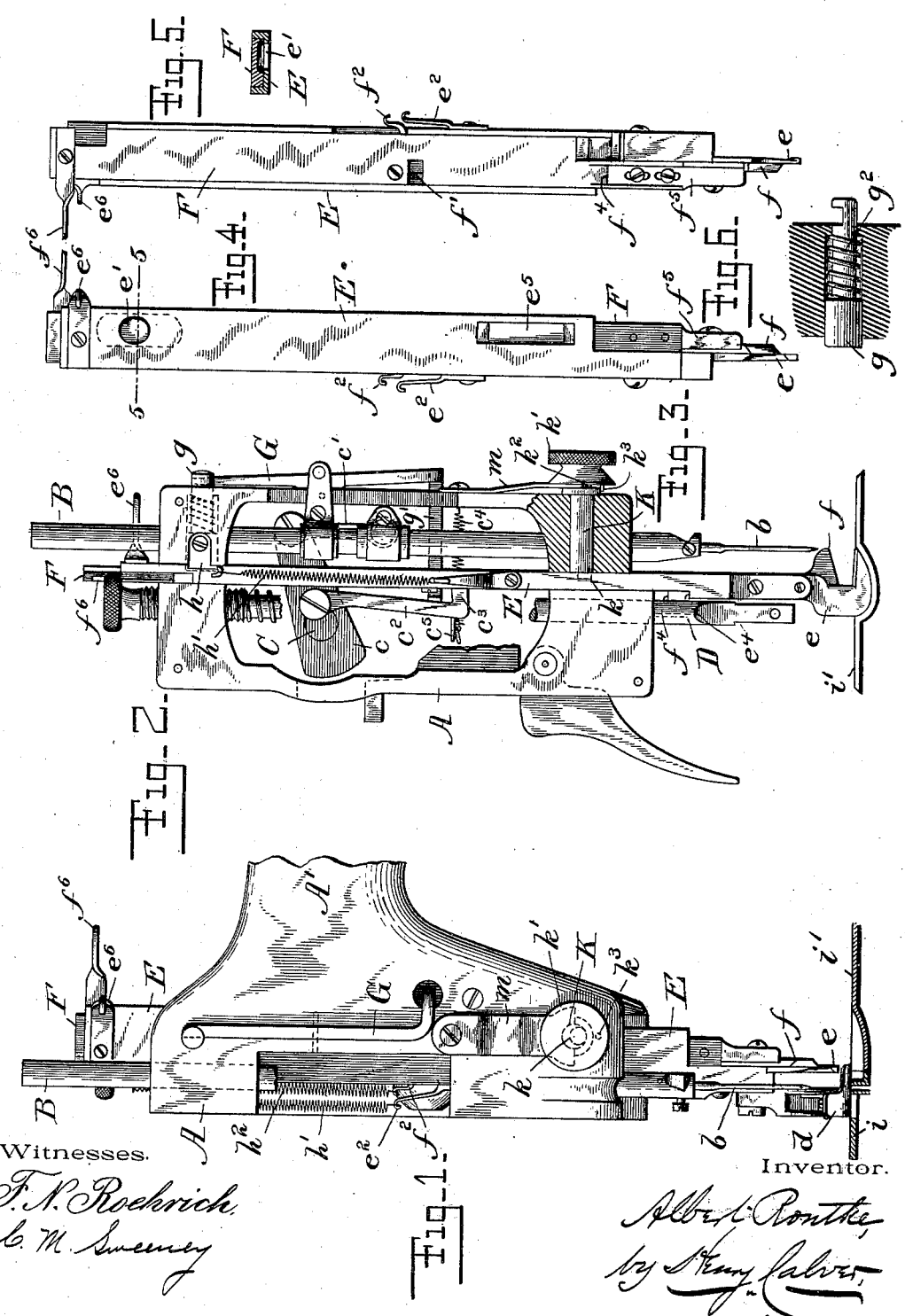
Witnesses.
F. N. Roehrich,
C. M. Sweeney
Inventor.
Albert Rontke,
by Henry Calver,
Attorney.

UNITED STATES PATENT OFFICE.

ALBERT RONTKE, OF ELIZABETH, NEW JERSEY, ASSIGNOR TO THE SINGER MANUFACTURING COMPANY, OF NEW JERSEY.

TRIMMER FOR SEWING-MACHINES.

SPECIFICATION forming part of Letters Patent No. 668,220, dated February 19, 1901.

Application filed December 4, 1899. Serial No. 739,078. (No model.)

*To all whom it may concern:*

Be it known that I, ALBERT RONTKE, a citizen of the United States, residing at Elizabeth, in the county of Union and State of New Jersey, have invented certain new and useful Improvements in Sewing-Machine Trimmers, of which the following is a specification, reference being had therein to the accompanying drawings.

This invention relates to a sewing-machine trimmer or trimming attachment for trimming off the edges of the work simultaneously with the stitching operation; and the invention has for its object to provide an effective device of this kind which may be readily thrown into and out of operation and which may be conveniently adjusted laterally or toward and from the needle to vary the distance between the line of trimming and the line of stitching.

In the accompanying drawings, Figure 1 is a side view of a portion of a sewing-machine embodying the invention, and Fig. 2 a sectional front end view of the same. Figs. 3 and 4 are detail opposite side views of the blade-carrying trimmer-bars, and Fig. 5 a cross-section of same on line 5 5 of Fig. 3. Fig. 6 is a detail view of the spring-pressed pivot-pin for the trimmer-bars.

Referring to the drawings, A denotes the head at the forward end of the bracket-arm A' of a sewing-machine, which is or may be of any ordinary or suitable construction. The needle-bar B, carrying the usual eye-pointed needle $b$, is in the present instance operated from a rock-shaft C, provided with a crank-arm $c$, connected by a pitman $c'$ with said needle-bar.

D is the presser-bar, provided with the presser-foot $d$.

Mounted in the head A is a vertically-movable, but normally stationary, trimmer-bar E, provided at its lower end with a blade $e$, having an upwardly-facing cutting edge. The bar E is provided at its edges with flanges forming a groove or slideway, in which the reciprocating bar F, carrying the blade $f$, is adapted to move up and down, the cutting edge of said blade $f$ facing downward. Thus the contiguous blades $e$ and $f$ form a shear trimmer adapted to sever textile or other fabrics.

To the oscillating crank-arm $c$ is jointed a link or pitman $c^2$, having at its lower end a toe or hook $c^3$, adapted to enter a recess or pocket $f'$, with which the bar F is provided, said pitman $c^2$ being normally drawn toward said bar to hold its toe or hook in the said recess or pocket $f'$ by a spring $c^4$, one end of which is attached to the wall of the head A and the other end of which is connected with a hooked wire or eyelet $c^5$, with which the pitman $c^2$ is provided.

The bar E is provided near its upper end with a hole $e'$ to receive the inner end of a spring-pressed pivot-pin $g$, notched at its outer end for the reception of the upper end of a lever G, pivoted near its middle to the head A and provided at its lower end with a right-angular arm $g'$, extending within said head and bearing at its inner end against the link $c^2$. Secured in a recess in the upper portion of the head A is a small bracket $h$, provided with two hooks, on which are hung two coil-springs $h'\ h^2$, the lower ends of which engage, under suitable tension, hooks $e^2$ and $f^2$, with which the bars E and F are respectively provided.

The throat-plate $i$ and work-plate $i'$ of the machine are recessed for the reception of the stationary blade $e$, so that when the trimming device is in its operative or working position the upper or cutting edge of said blade will be about on a level with the upper surfaces of said plates. When it is desired to throw the trimmer out of operation, the attendant presses on the lower end of the lever G, so as to overcome the stress of the spring $c^4$ and also of the spring $g^2$, surrounding the pivot-pin $g$, thereby withdrawing said pin from the hole $e'$ of the bar E and by forcing the arm $g'$ inward disengaging the toe or hook $c^3$ of the pitman $c^2$ from the recess or pocket $f'$ of the bar F, thus leaving both of said bars free to be lifted by the springs $h'$ and $h^2$ to raise the cutting-blades $e$ and $f$ above the work-plate to the inoperative position shown by Fig. 1. To restore the parts to working position, (denoted by Fig. 2,) it is simply necessary to press downward on the finger-pieces $e^6\ f^6$, with which the trimmer-bars E and F are provided at their upper ends, with sufficient force to overcome the stress of the springs $h'$ and $h^2$. The downward movement of the bar F is limited, when the recess or pocket $f'$ thereof comes opposite the toe or hook $c^3$ of the pitman $c^2$, by the stop-screw $f^3$, with which the said bar is provided, said stop-screw engaging the upper surface of said toe or hook. The upward movements of the bars E and F under the stress of the lifting-springs $h'$ and $h^2$ are limited by the shoulders $e^4$ and $f^4$, with which said bars are respectively provided, said shoulders engaging the surface at the lower end of the head A. The shoulder $f^4$ is in the present instance formed at the upper end of a bar or stock $f^5$, adjustably secured to the bar F, and to which bar or stock $f^5$ the blade $f$ is in turn attached. This construction provides for a limited vertical adjustment of the said blade $f$ to compensate for wear.

The normally stationary trimmer-bar E is provided with a slot $e^5$, engaged by an eccentric $k$, formed on the inner end of a pin K, the head of which is provided with a milled portion $k'$, by which said pin may be conveniently turned to cause the eccentric $k$, working in the said slot $e^5$, to swing the bars E and F on the pivot-pin $g$ to adjust the cutting-blades carried by said bars laterally or toward and from the needle $d$ for the purpose of varying the distance between the line of trimming and the line of stitching. The lateral adjustment of the bar F simultaneously with the bar E is due to the fact that the said bar F is embraced by the flanges at the edges of the said bar E.

The adjusting-pin K is retained in place and is frictionally held from accidental turning (which might disturb the adjustment) by a forked spring $m$, attached to the head A and engaging an annular groove $k^2$, with which the head of said pin K is provided, the shoulder at the inner part of the head of said pin being pressed against the head A by said spring. A small stop-pin $k^3$, adjacent to the groove $k^2$, and arranged to engage the ends of the forked portion of the spring $m$, serves to limit the turning movement of the pin K in either direction.

From the foregoing it will be understood that the invention provides an effective sewing-machine trimmer which may be readily thrown into or out of operation when the machine is at rest, when there is no work in the machine, which may be instantly thrown out of operation when the machine is running, and which may also be adjusted laterally to vary the distance between the line of trimming and the line of stitching either when the machine is running or when it is at rest. The invention, however, is not to be understood as being limited to the details herein shown and described, as these may be varied widely without departing from the essence of the invention.

Having thus described my invention, I claim and desire to secure by Letters Patent—

1. In a sewing-machine trimmer, the combination with a normally stationary and a reciprocating blade-carrying trimmer-bar both mounted within the head of the machine and having their cutting-blades in operative relation to each other, said bars being both vertically movable so as to adapt the trimming device to be lifted to an inoperative position above the work-plate when desired, of means for operating said reciprocating bar.

2. In a sewing-machine trimmer, the combination with a normally stationary and a reciprocating blade-carrying trimmer-bar both mounted in the head of the machine and having their cutting-blades in operative relation to each other, of means for disconnecting the operating device of the said reciprocating bar from the said bar, and means for lifting both of said bars to an inoperative position when said operating device has been thus disconnected.

3. In a sewing-machine trimmer, the combination with two laterally-adjustable blade-carrying trimmer-bars mounted in the head of the machine and having their blades in operative relation to each other, of means for reciprocating one of said bars.

4. In a sewing-machine trimmer, the combination with two laterally-adjustable blade-carrying trimmer-bars mounted in the head of the machine and having their blades in operative relation to each other, of means for reciprocating one of said bars, and means for simultaneously adjusting said bars laterally or toward or from the needle to vary the distance between the line of stitching and the line of trimming.

5. In a sewing-machine trimmer, the combination with two laterally-adjustable blade-carrying trimmer-bars pivotally mounted in the head of the machine and having their blades in operative relation to each other, of means for reciprocating one of said bars and means for simultaneously swinging both of said bars laterally on their pivot.

6. In a sewing-machine trimmer, the combination with a normally stationary blade-carrying trimmer-bar, of a reciprocating blade-carrying trimmer-bar sliding in a bearing or guideway afforded by said normally stationary bar, the blades carried by said bars being in operative relation to each other, and means for simultaneously adjusting both said bars laterally to vary the distance between the line of stitching and the line of trimming.

7. In a sewing-machine trimmer, the combination with a reciprocating blade-carrying trimmer-bar mounted in the head of the machine, and a normally stationary bar provided with a blade in operative relation to the blade of the said reciprocating bar, of an operating device for said reciprocating bar within said head, and a device, extending within said head, for disconnecting said operating device from said reciprocating bar.

8. In a sewing-machine trimmer, the combination with a laterally-adjustable trimmer-bar pivotally mounted in the head of the machine, and a coacting device for enabling the blade of said bar to cut the material, of means for adjusting the blade-carrying portion of said bar laterally or toward and from the needle, the said bar, in its lateral adjustment swinging on its pivotal mounting.

9. In a sewing-machine trimmer, the combination with the normally stationary but vertically-movable blade-carrying bar E, of the reciprocating blade-carrying bar F connected with said bar E to be movable laterally therewith, the blades carried by said bars being in operative relation to each other, a pin on which the said bar E is pivotally mounted, means for swinging said bars laterally by virtue of their pivotal mounting, and means for disengaging the said pin from the said bar E when the trimmer is to be thrown out of operation.

10. In a sewing-machine trimmer, the combination with the pivotally-mounted blade-carrying bar E, of the blade-carrying bar F movable vertically independently of the said bar E but adjustable laterally with the latter, the blades carried by said bars being in operative relation to each other, the pitman $c^2$ for reciprocating the said bar F, and means for operating said pitman.

11. In a sewing-machine trimmer, the combination with the pivotally-mounted blade-carrying bar E, of the blade-carrying bar F movable vertically independently of the said bar E but adjustable laterally with the latter, the blades carried by said bars being in operative relation to each other, the pitman $c^2$ for reciprocating the said bar F, means for operating said pitman, and means for connecting said pitman with and for disconnecting it from the said bar F.

12. In a sewing-machine trimmer, the combination with the pivotally-mounted blade-carrying bar E, of the reciprocating blade-carrying bar F connected with said bar E to swing laterally therewith, the blades carried by said bars being in operative relation to each other, and the turning-pin K having an eccentric for adjusting said bars laterally.

13. In a sewing-machine trimmer, the combination with the pivotally-mounted blade-carrying bar E, of the reciprocating blade-carrying bar F connected with said bar E to swing laterally therewith, the blades carried by said bars being in operative relation to each other, the turning-pin K having an eccentric for adjusting said bars laterally, and means for holding said pin in any desired position of adjustment.

14. The combination with the crank-arm $c$ provided with the pitman $c^2$ having a toe or hook $c^3$, the blade-carrying bar F having a recess or pocket to be entered by said toe or hook, a coöperating device for enabling the blade of said bar to cut the material, a spring for holding said toe or hook in engagement with said bar, and a releasing device for disengaging said toe or hook from said bar.

15. The combination with the blade-carrying trimmer-bars E and F the blades of which are in operative relation to each other, of the spring-pressed pin $g$ on which said bar E is pivotally mounted, the reciprocating pitman $c^2$, a spring for holding the said pitman in engagement with said bar F, and a releasing-lever G for withdrawing the said pin from the said bar E and for simultaneously disengaging the said pitman $c^2$ from the said bar F.

16. The combination with the blade-carrying trimmer-bars E and F the blades of which are in operative relation to each other, of the spring-pressed pin $g$ on which said bar E is pivotally mounted, the reciprocating pitman $c^2$, a spring for holding the said pitman in engagement with said bar F, a releasing-lever G for withdrawing the said pin from the said bar E and for simultaneously disengaging the said pitman $c^2$ from the said bar F, and springs for lifting said bars to their inoperative positions when they are disengaged from said pin and pitman.

In testimony whereof I affix my signature in the presence of two witnesses.

ALBERT RONTKE.

Witnesses:
HENRY J. MILLER,
HAROLD W. BROWN.